(12) United States Patent
Jones et al.

(10) Patent No.: US 8,429,042 B2
(45) Date of Patent: Apr. 23, 2013

(54) METHODS FOR PERFORMING DATA PROCESSING OPERATIONS ASSOCIATED WITH SECURITIES AND SECURITY STRUCTURES

(75) Inventors: Emerson P. Jones, Greenwich, CT (US); Ivan Ross, Scarsdale, NY (US); David C. Ryan, New York, NY (US)

(73) Assignee: Goldman, Sachs & Co., New York, NY (US)

( * ) Notice: Subject to any disclaimer, the term of this patent is extended or adjusted under 35 U.S.C. 154(b) by 1778 days.

(21) Appl. No.: 10/449,986

(22) Filed: May 30, 2003

(65) Prior Publication Data

US 2004/0024676 A1 Feb. 5, 2004

Related U.S. Application Data

(60) Provisional application No. 60/384,893, filed on May 30, 2002.

(51) Int. Cl.
*G06Q 40/00* (2012.01)
(52) U.S. Cl.
USPC .......................................................... 705/35
(58) Field of Classification Search ............... 705/35
See application file for complete search history.

(56) References Cited

U.S. PATENT DOCUMENTS

| | | | |
|---|---|---|---|
| 6,064,987 A * | 5/2000 | Walker et al. | 705/38 |
| 6,263,321 B1 * | 7/2001 | Daughtery, III | 705/36 R |
| 2003/0158809 A1 * | 8/2003 | Carney et al. | 705/37 |

OTHER PUBLICATIONS

Chesney et al, Reducing Asset Substitution w/ Warrant and Convertible Debt Issues, Journal of Derivatives, Fall 2001, pp. 39-52.*
Wiely et al, Dictionary of Economics, 1995, retrieved from xreferplus.com, Defines coupon rate.*
Wiely et al, Dictionary of Economics, 1995, retrieved from xreferplus.com, Defines convertible bond.*
U.S. Appl. No. 10/624,986, filed Jul. 22, 2003, Jones et al.

* cited by examiner

*Primary Examiner* — Olabode Akintola
(74) *Attorney, Agent, or Firm* — Perkins Coie LLP

(57) ABSTRACT

The present disclosure relates to methods for performing data processing operations associated with securities and security structures. More particularly, one embodiment of the present invention relates to a computer implementable method for performing data processing operations associated with a security, comprising: structuring the security to include a convertible note, which convertible note is convertible into a fixed number of shares of common stock of the issuer, which convertible note has associated therewith a maturity and which convertible note pays interest; and calculating whether a price of a share of common stock of the issuer is less than a predetermined threshold percentage of a conversion price associated with the note so that the note is not convertible if the price of the share of common stock of the issuer is less than the predetermined threshold percentage of the conversion price associated with the note.

18 Claims, 1 Drawing Sheet

METHODS FOR PERFORMING DATA PROCESSING OPERATIONS ASSOCIATED WITH SECURITIES AND SECURITY STRUCTURES

CROSS-REFERENCE TO RELATED APPLICATIONS

This application claims the benefit under 35 U.S.C. 119(e) of U.S. Provisional Application Ser. No. 60/384,893 filed May 30, 2002.

FIELD OF THE INVENTION

The present invention relates to methods for performing data processing operations associated with securities and security structures.

More particularly, one embodiment of the present invention relates to a computer implementable method for performing data processing operations associated with a security, comprising the steps of: structuring the security to include a convertible note, which convertible note is convertible into a fixed number of shares of common stock of the issuer, which convertible note has associated therewith a maturity and which convertible note pays interest; determining if a present time is within a first time span following issuance of the note; calculating, if the present time is within the first time span, a value of a fixed rate first stage interest payment; determining if a present time is within a second time span following the first time span; calculating, if the present time is within the second time span, a value of a variable rate second stage interest payment, wherein calculation of the value of the variable rate second stage interest payment is based upon an economically reasonable analysis in light of market conditions so that a conversion of the note by a holder of the note does not occur at the time the value is calculated; and calculating whether a price of a share of common stock of the issuer is less than a predetermined threshold percentage of a conversion price associated with the note so that the note is not convertible if the price of the share of common stock of the issuer is less than the predetermined threshold percentage of the conversion price associated with the note.

Another embodiment of the present invention relates to a security issued by an issuer, comprising: a convertible note, which convertible note is convertible into a fixed number of shares of common stock of the issuer; wherein the note has associated therewith a maturity; wherein the note pays interest; wherein the interest is paid at a fixed first stage interest rate during a first time span following issuance of the note and the interest is paid at a variable second stage interest rate during a second time span following the first time span; wherein the variable second stage interest rate is assigned a value so that, based upon an economically reasonable analysis in light of market conditions, a conversion of the note by a holder of the note does not occur at the time the value is assigned; and wherein the note is not convertible if a price of a share of common stock of the issuer is less than a predetermined threshold percentage of a conversion price associated with the note.

For the purposes of the present application the term "entity" is intended to refer to any person, organization, or group.

Further, for the purposes of the present application the term "security" is intended to refer to an instrument evidencing debt and/or ownership of asset(s).

Further still, for the purposes of the present application the term "parity value" is intended to refer to the value of shares (at any given time) to which a security is convertible.

Figure 1:
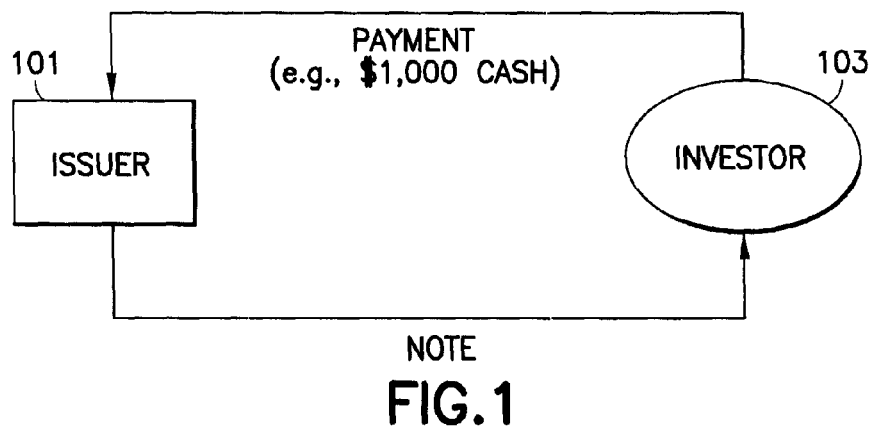
FIG. 1 shows, in connection with an embodiment of the present invention, data processing operations and a security structure associated with issuance of a security.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

In one embodiment a computer implementable method for performing data processing operations associated with a security is provided, comprising the steps of: structuring the security to include a convertible note, which convertible note is convertible into a fixed number of shares of common stock of the issuer, which convertible note has associated therewith a maturity and which convertible note pays interest; determining if a present time is within a first time span following issuance of the note; calculating, if the present time is within the first time span, a value of a fixed rate first stage interest payment; determining if a present time is within a second time span following the first time span; calculating, if the present time is within the second time span, a value of a variable rate second stage interest payment, wherein calculation of the value of the variable rate second stage interest payment is based upon an economically reasonable analysis in light of market conditions so that a conversion of the note by a holder of the note does not occur at the time the value is calculated; and calculating whether a price of a share of common stock of the issuer is less than a predetermined threshold percentage of a conversion price associated with the note so that the note is not convertible if the price of the share of common stock of the issuer is less than the predetermined threshold percentage of the conversion price associated with the note.

In one example the issuer may not redeem the note prior to maturity.

In another example the issuer may not redeem the note during a non-redemption span of time following issuance of the note.

In another example the issuer may redeem the note following the non-redemption span of time.

In another example the issuer may redeem the note for cash.

In another example a redemption price may equal an issue price of the security plus any accrued and unpaid interest.

In another example regardless of whether the price of a share of common stock of the issuer is less than the threshold percentage of the conversion price associated with the note, the note may be convertible upon the occurrence of at least one of: (a) a market value of the security being less than a predetermined level of a then prevailing parity value; (b) a credit rating of the note is downgraded from where the credit rating was at issuance of the security; and (c) the note is redeemed by the issuer.

In another example the threshold percentage may be at least 100% and the predetermined level may be at most 100%.

In another example the issuer may be a publicly traded entity.

In another example the note may be subordinated to all existing and future senior unsecured debt of the issuer.

In another example the note may be structured as a trust preferred note.

In another example the issuer may have the option to defer interest payments associated with the note.

In another example the interest may be paid periodically at a period selected from the group including, but not limited to: (a) daily; (b) weekly; (c) monthly; (d) quarterly; (e) semi-annually; and (f) annually.

In another example the steps may be carried out in the order recited.

In another embodiment a computer implementable method for performing data processing operations associated with a security is provided, comprising the steps of: structuring the security to include a convertible note, which convertible note is convertible into a fixed number of shares of common stock of the issuer, which convertible note has associated therewith a maturity and which convertible note pays interest periodically at a period selected from the group including, but not limited to: (a) daily; (b) weekly; (c) monthly; (d) quarterly; (e) semi-annually; and (f) annually; determining if a present time is within a first time span following issuance of the note; calculating, if the present time is within the first time span, a value of a fixed rate first stage interest payment; determining if a present time is within a second time span following the first time span; calculating, if the present time is within the second time span, a value of a variable rate second stage interest payment, wherein calculation of the value of the variable rate second stage interest payment is based upon an economically reasonable analysis in light of market conditions so that a conversion of the note by a holder of the note does not occur at the time the value is calculated; and calculating whether a price of a share of common stock of the issuer is less than a predetermined threshold percentage of a conversion price associated with the note so that the note is not convertible if the price of the share of common stock of the issuer is less than the predetermined threshold percentage of the conversion price associated with the note; wherein the issuer can not redeem the note during a non-redemption span of time following issuance of the note; wherein the issuer may redeem the note following the non-redemption span of time; wherein the issuer may redeem the note for cash; wherein a redemption price equals an issue price of the security plus any accrued and unpaid interest; wherein, regardless of whether the price of a share of common stock of the issuer is less than the threshold percentage of the conversion price associated with the note, the note is convertible upon the occurrence of at least one of: (a) a market value of the security being less than a predetermined level of a then prevailing parity value; (b) a credit rating of the note is downgraded from where the credit rating was at issuance of the security; and (c) the note is redeemed by the issuer; wherein the threshold percentage is at least 100% and the predetermined level is at most 100%; and wherein the issuer is a publicly traded entity.

In one example the note may be subordinated to all existing and future senior unsecured debt of the issuer.

In another example the note may be structured as a trust preferred note.

In another example the issuer may have the option to defer interest payments associated with the note.

In another example the steps may be carried out in the order recited.

In another embodiment a security issued by an issuer is provided, comprising: a convertible note, which convertible note is convertible into a fixed number of shares of common stock of the issuer; wherein the note has associated therewith a maturity; wherein the note pays interest; wherein the interest is paid at a fixed first stage interest rate during a first time span following issuance of the note and the interest is paid at a variable second stage interest rate during a second time span following the first time span; wherein the variable second stage interest rate is assigned a value so that, based upon an economically reasonable analysis in light of market conditions, a conversion of the note by a holder of the note does not occur at the time the value is assigned; and wherein the note is not convertible if a price of a share of common stock of the issuer is less than a predetermined threshold percentage of a conversion price associated with the note.

In one example the issuer may not redeem the note prior to maturity.

In another example the issuer may not redeem the note during a non-redemption span of time following issuance of the note.

In another example the issuer may redeem the note following the non-redemption span of time.

In another example the issuer may redeem the note for cash.

In another example a redemption price may equal an issue price of the security plus any accrued and unpaid interest.

In another example regardless of whether the price of a share of common stock of the issuer is less than the threshold percentage of the conversion price associated with the note, the note may be convertible upon the occurrence of at least one of: (a) a market value of the security being less than a predetermined level of a then prevailing parity value; (b) a credit rating of the note is downgraded from where the credit rating was at issuance of the security; and (c) the note is redeemed by the issuer.

In another example the threshold percentage may be at least 100% and the predetermined level may be at most 100%.

In another example the issuer may be a publicly traded entity.

In another example the note may be subordinated to all existing and future senior unsecured debt of the issuer.

In another example the note may be structured as a trust preferred note.

In another example the issuer may have the option to defer interest payments associated with the note.

In another example the interest may be paid periodically at a period selected from the group including, but not limited to: (a) daily; (b) weekly; (c) monthly; (d) quarterly; (e) semi-annually; and (f) annually.

In another embodiment a security issued by an issuer is provided, comprising: a convertible note, which convertible note is convertible into a fixed number of shares of common stock of the issuer; wherein the note has associated therewith a maturity; wherein the note pays interest; wherein the interest is paid at a fixed first stage interest rate during a first time span following issuance of the note and the interest is paid at a variable second stage interest rate during a second time span following the first time span; wherein the variable second stage interest rate is assigned a value so that, based upon an economically reasonable analysis in light of market conditions, a conversion of the note by a holder of the note does not occur at the time the value is assigned; and wherein the interest is payable periodically at a period selected from the group including, but not limited to: (a) daily; (b) weekly; (c) monthly; (d) quarterly; (e) semi-annually; and (f) annually; wherein the note is not convertible if a price of a share of common stock of the issuer is less than a predetermined threshold percentage of a conversion price associated with the note; wherein the issuer can not redeem the note during a non-redemption span of time following issuance of the note; wherein the issuer may redeem the note following the non-redemption span of time; wherein the issuer may redeem the note for cash; wherein a redemption price equals an issue price of the security plus any accrued and unpaid interest; wherein, regardless of whether the price of a share of common stock of the issuer is less than the threshold percentage of the conversion price associated with the note, the note is convertible upon the occurrence of at least one of: (a) a market value of the security being less than a predetermined level of a then prevailing parity value; (b) a credit rating of the note is downgraded from where the credit rating was at issuance of the security; and (e) the note is redeemed by the issuer; wherein the threshold percentage is at least 100% and the predetermined level is at most 100%; and wherein the issuer is a publicly traded entity.

In another example the note may be subordinated to all existing and future senior unsecured debt of the issuer.

In another example the note may be structured as a trust preferred note.

In another example the issuer may have the option to defer interest payments associated with the note.

Referring now to FIG. 1, one embodiment of the present invention is shown. As seen in this FIG. 1, Issuer 101 issues a note (hereinafter sometimes referred to as a CUBZ or a CUBZ security). The note is purchased by Investor 103. In one example (which example is intended to be illustrative and not restrictive) the note may be a 30-year convertible note with a face value of $1,000. In another example (which example is intended to be illustrative and not restrictive) the note may be subordinated to all existing and future senior unsecured debt and may be convertible at any time over the life of the note into a fixed number of shares (e.g., common shares) of Issuer 101. In another example (which example is intended to be illustrative and not restrictive) Issuer 101 may have the right to call the note at par at one or more times (e.g., after the $3^{rd}$ year anniversary of the issue date).

Figure 2:
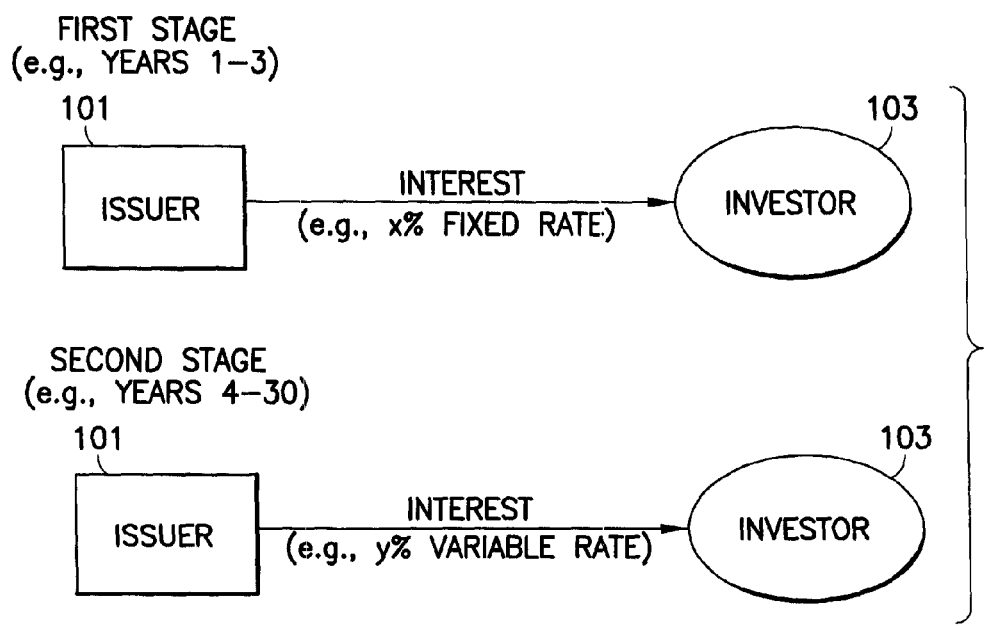
FIG. 2 shows, in connection with an embodiment of the present invention, data processing operations and a security structure associated with ongoing cash flows.

Referring now to FIG. 2, ongoing cash flows associated with the embodiment of FIG. 1 are shown. As seen in this FIG. 2, during a first stage (e.g., years 1-3 after issuance) the note may pay interest having a fixed rate and during a second stage (e.g., years 4-30) the note may pay interest having a variable rate. In one example (which example is intended to be illustrative and not restrictive) the interest may be paid quarterly; the fixed rate may be between 6.50-7.50%; and the variable rate may be set to effect, based upon an economically reasonable analysis in light of market conditions, forstalling a conversion of the note by a holder of the note (the fixed rate and/or the variable rate may be set, for example, by the issuer). In another example (which example is intended to be illustrative and not restrictive) the variable rate may be based on dividend(s) otherwise payable on the shares of issuer stock underlying the note (such dividend(s) may be actual or projected (e.g., projected by the issuer)). In another example (which example is intended to be illustrative and not restrictive) the variable rate may be based on dividend(s) otherwise payable on the shares of issuer stock underlying the note plus a premium (e.g., 1.75-2.25%). In another example (which example is intended to be illustrative and not restrictive) the variable rate may be based upon another payment similar to a dividend payment (e.g., any other type of such a "pass-through" payment).

Another embodiment of the present invention may relate to a note issued by an issuer, wherein:

Issuer: The issuer may be a publicly traded entity (e.g., a corporation).

Security: Convertible note, which convertible note is convertible at the option of an investor at any time on or prior to maturity, unless previously redeemed or otherwise purchased by the issuer, into a fixed number of shares of issuer common stock.

Form Of Offering: May be a registered offering or 144A (with registration rights).

Issue Price: Any desired value (e.g., $1,000 per note).

Maturity: Any desired maturity (e.g., the notes may mature in 30 years, subject to any issuer's redemption right (see below)).

Principal Terms Of Debt: The note may have any desired face value (e.g., $1,000) and may be subordinated to all existing and future senior unsecured debt of the issuer. The note may be structured as one or more trust securities. The issuer may have the right to defer interest payments (e.g., for up to 60 months). The note may pay interest (e.g., quarterly), based on the following schedule: Years 1-3—any desired value (e.g., 6.50-7.50% per annum); Years 4-30—the dividend amount otherwise payable on the issuer common stock underlying the note, plus any desired value (e.g., 1.75-2.25% per annum).

Conversion Rights: The note may be convertible at the option of an investor at any time on or prior to maturity, unless previously redeemed or otherwise purchased by the issuer, at a conversion ratio of x shares of issuer common stock per note (wherein x is any desired value). The conversions ratio x may be set by the time of the issuance of the note and may be adjusted subject to certain events that affect the common shares of the issuer. The note may not be convertible if the issuer's common stock price is less than a threshold percentage (e.g., 110%) of the conversion price. However, an investor may nevertheless have the right to convert if: (a) the market value of the security is less than x % (e.g., 95%) of the then prevailing parity value; (2) the credit rating of the note is downgraded; (3) the note is called for redemption by the issuer; and/or (4) the occurrence of specified corporate transaction(s). The note may have associated therewith a conversion premium (e.g., 20%).

Issuer Call Right: The issuer may or may not have a call right. If the issuer does have a call right, such call right may not be permitted to be exercised for a certain amount of time following issuance (e.g., 3-5 years). Further, if the issuer does have a call right the note may be redeemable for cash (e.g., at any permitted time) at the option of the issuer, in whole or in part, at a redemption price equal to the issue price plus accrued and unpaid interest.

In another embodiment, a CUBZ security may be treated as contingent debt for U.S. tax purposes, generating annual tax deductions at straight debt rate (e.g., long term debt rate), irrespective of the stated yield (e.g., this may allow the issuer to realize tax deductions on the note based on the issuer's comparable 30 year debt rate). There may be potential recapture of tax deductions to the extent the settlement value of the security is less than the tax accreted value of the security.

In another embodiment, a CUBZ security may be treated as convertible debt for accounting purposes as follows:

It is believed that under current accounting rules the issuer may be required to account for the instrument based on "if converted" treatment (subject to the conversion rights provision outlined above). It is believed that interest expense under such "if converted" treatment may be booked based on the constant yield method, such that the amount recognized on an annual basis would be based on the weighted average of the interest payable in each of years 1-3 (for example) and years 4-30 (for example).

It is believed that FASB's pending Liabilities & Equities Project may affect the accounting for convertible securities by requiring bifurcation into two parts: (i) "straight" (i.e., non-convertible) debt; and (ii) a warrant. It is believed, however, that impact may likely be minimal with respect to interest expense, given the use of constant yield methodology upfront within the context of "if-converted" accounting.

From a balance sheet perspective, it is believed that the issuer may initially show a smaller liability on the balance sheet, as only a portion of the proceeds may be allocated to the debt component.

It is believed that debt may be treated as having been issued at a discount and may be recorded upfront at the discounted value, rather than face value.

From an income statement perspective, it is believed that the issuer may show increased interest expense, reflecting amortization of the discount.

As the note accretes up to face value, it is believed that the issuer may record additional interest expense, so that the Gap interest expense exceeds the stated yield to maturity.

It is believed that this additional interest expense may not, however, be deductible for tax purposes. Accordingly, it is believed that the issuer may be required to account for such interest on a pre-tax basis (it is believed that there is some uncertainty as to whether FASB will allow issuers to tax-effect this interest expense).

It is believed that the impact of applying the new rules to a CUBZ security may be minimal with respect to interest expense, as applying a constant yield (i.e., weighted average interest over the life of the security) to the face amount of the security (the current treatment) may be roughly equivalent to applying the issuer's straight debt rate to the amount of value allocated to the debt component of the security.

Marking-to-market any puts may generate earnings volatility.

For example, in the event the stock price were to decline, put options would become more valuable, and the issuer would realize a mark-to-market loss on the put.

The issuer may also recognize gain or loss on the debt component when the convertible security is converted or otherwise extinguished.

Debt component may be treated as having been retired at market value.

Issuer may likely recognize loss when interest rates have declined.

Gain or loss may be treated as an ordinary (rather than extraordinary) item.

In another embodiment, a CUBZ security may: (a) get equity credit similar to QUIPS-type securities; (b) reduce cash flow cost relative to conventional convertible QUIPS; and/or (c) not include early puts typically associated with conventional shorter-dated convertibles.

In another embodiment, the conversion premium may be reduced to offset rate reduction for the second stage (e.g., post year 3 period).

In another embodiment, a CUBZ security may comprise essentially a convertible unitary bifurcated zero-put security.

Of note, the method embodiments described herein may, of course, be implemented using any appropriate computer hardware and/or computer software. In this regard, those of ordinary skill in the art are well versed in the type of computer hardware that may be used (e.g., a mainframe, a mini-computer, a personal computer ("PC"), a network (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain methods have been described herein as being "computer implementable". In this regard it is noted that while such methods can be implemented using a computer, the methods do not necessarily have to be implemented using a computer. Also, to the extent that such methods are implemented using a computer, not every step must necessarily be implemented using a computer. Further, a CUBZ security may comprise a plurality of notes. Further still, while the invention has been described principally with respect to one issuer and one investor, any number of issuers and/or investors may be involved. Further still, while the invention has been described principally with respect to a note, the invention may, of course, utilize any debt mechanism of the type known by those of ordinary skill in the art (e.g., including, but not limited to, debenture(s) and/or bond(s)). Further still, while the invention has been described principally with respect to interest and interest rates, the invention may, of course, utilize one or more coupons (e.g., one or more cash coupons) and/or accretion.

What is claimed is:

1. A computer-implemented method comprising:
   structuring a security to include a convertible note, wherein the convertible note is convertible into a fixed number of shares of common stock of an issuer, the convertible note has associated therewith a maturity and the convertible note pays interest;
   determining, via a computer, if a present time is within a first time span following issuance of the note;
   calculating, via the computer, if the present time is within the first time span, a value of a fixed rate first stage interest payment;
   determining, via the computer, if a present time is within a second time span following the first time span;
   calculating, via the computer, if the present time is within the second time span, a value of a variable rate second stage interest payment, wherein calculation of the value of the variable rate second stage interest payment is based upon an economically reasonable analysis in light of market conditions so that a conversion of the note by a holder of the note does not occur at the time the value is calculated; and
   determining, via the computer, whether a price of a share of common stock of the issuer is less than a predetermined threshold percentage of a conversion price associated with the note so that the note is not convertible if the price of the share of the common stock of the issuer is less than the predetermined threshold percentage of the conversion price associated with the note.

2. The method of claim 1, wherein the issuer can not redeem the note prior to maturity.

3. The method of claim 1, wherein the issuer can not redeem the note during a non-redemption span of time following issuance of the note.

4. The method of claim 3, wherein the issuer may redeem the note following the non-redemption span of time.

5. The method of claim 4, wherein the issuer may redeem the note for cash.

6. The method of claim 5, wherein a redemption price equals an issue price of the security plus any accrued and unpaid interest.

7. The method of claim 1, wherein the threshold percentage is at least 100%.

8. The method of claim 1, wherein the issuer is a publicly traded entity.

9. The method of claim 1, wherein the note is subordinated to all existing and future senior unsecured debt of the issuer.

10. The method of claim 1, wherein the note is structured as a trust preferred note.

11. The method of claim 1, wherein the issuer has an option to defer interest payments associated with the note.

12. The method of claim 1, wherein the interest payments are paid periodically at a period selected from the group of: (a) daily; (b) weekly; (c) monthly; (d) quarterly; (e) semi-annually; and (f) annually.

13. The method of claim 1, wherein the steps are carried out in the order recited.

14. A computer-implemented method comprising:
structuring a security to include a convertible note, wherein the convertible note is convertible into a fixed number of shares of common stock of an issuer, the convertible note has associated therewith a maturity and the convertible note pays interest periodically at a period selected from the group of: (a) daily; (b) weekly; (c) monthly; (d) quarterly; (e) semi-annually; and (f) annually;
determining, via a computer, if a present time is within a first time span following issuance of the note;
calculating, via a computer, if the present time is within the first time span, a value of a fixed rate first stage interest payment;
determining, via the computer, if a present time is within a second time span following the first time span;
calculating, via the computer, if the present time is within the second time span, a value of a variable rate second stage interest payment, wherein calculation of the value of the variable rate second stage interest payment is based upon an economically reasonable analysis in light of market conditions so that a conversion of the note by a holder of the note does not occur at the time the value is calculated; and
determining, via the computer, whether a price of a share of common stock of the issuer is less than a predetermined threshold percentage of a conversion price associated with the note so that the note is not convertible if the price of the share of common stock of the issuer is less than the predetermined threshold percentage of the conversion price associated with the note except, regardless of whether the price of a share of common stock of the issuer is less than the threshold percentage of the conversion price associated with the note, the note is convertible upon the occurrence of at least one of: (a) a market value of the security being less than a predetermined level of a then prevailing parity value; (b) a credit rating of the note is downgraded from where the credit rating was at issuance of the security; and (c) the note is redeemed by the issuer;
wherein the issuer can not redeem the note during a non-redemption span of time following issuance of the note;
wherein the issuer may redeem the note following the non-redemption span of time;
wherein the issuer may redeem the note for cash;
wherein a redemption price equals an issue price of the security plus any accrued and unpaid interest;
wherein the threshold percentage is at least 100% and the predetermined level is at most 100%; and
wherein the issuer is a publicly traded entity.

15. The method of claim 14, wherein the note is subordinated to all existing and future senior unsecured debt of the issuer.

16. The method of claim 14, wherein the note is structured as a trust preferred note.

17. The method of claim 14, wherein the issuer has an option to defer interest payments associated with the note.

18. The method of claim 14, wherein the steps are carried out in the order recited.

* * * * *